(12) United States Patent
Atoun et al.

(10) Patent No.: US 11,317,005 B2
(45) Date of Patent: Apr. 26, 2022

(54) SYSTEM AND METHOD FOR DETERMINING COMPRESSION RATES FOR IMAGES COMPRISING TEXT

(71) Applicant: Glassbox Ltd., Petah Tikva (IL)

(72) Inventors: Eliav Atoun, Tel Mond (IL); Oleg Bezrudny, Petah Tikva (IL)

(73) Assignee: GLASSBOX LTD., Petah Tikva (IL)

( * ) Notice: Subject to any disclaimer, the term of this patent is extended or adjusted under 35 U.S.C. 154(b) by 150 days.

(21) Appl. No.: 16/699,772

(22) Filed: Dec. 2, 2019

(65) Prior Publication Data

US 2020/0186675 A1 Jun. 11, 2020

Related U.S. Application Data (60) Provisional application No. 62/777,780, filed on Dec. 11, 2018.

(51) Int. Cl.
*H04N 1/417* (2006.01)
*G06K 9/00* (2006.01)
*G06K 9/34* (2006.01)

(52) U.S. Cl.
CPC ....... *H04N 1/4172* (2013.01); *G06K 9/00456* (2013.01); *G06K 9/348* (2013.01); *G06K 2209/01* (2013.01)

(58) Field of Classification Search
CPC . H04L 69/04; H04L 67/1095; G06F 16/1744; G06F 16/10; G06F 16/13; G06F 3/1454
See application file for complete search history.

(56) References Cited

U.S. PATENT DOCUMENTS

| | | | |
|---|---|---|---|
| 8,755,604 B1* | 6/2014 | Gross | G06K 9/72 382/181 |
| 8,997,081 B1 | 3/2015 | Manion et al. | |
| 2014/0032735 A1* | 1/2014 | Kapoor | G06F 3/1454 709/224 |
| 2014/0280517 A1 | 9/2014 | White et al. | |
| 2018/0157906 A1 | 6/2018 | Loginov et al. | |
| 2020/0042837 A1* | 2/2020 | Skinner | G06F 21/62 |

OTHER PUBLICATIONS

Appsee User Recordings.

* cited by examiner

*Primary Examiner* — Ross Varndell (57) ABSTRACT

A system for determining compression rates for images, the system comprising a processing resource configured to: obtain a given image at least partially comprising a given text; compress the given image at a given compression ratio, giving rise to a compressed image; perform Optical Character Recognition (OCR) on the compressed image, giving rise to OCR text; compare the OCR text to the given text, giving rise to comparison results; upon the comparison results meeting a rule, increase the given compression rate; and upon the compression results not meeting a rule, return to a previous compression rate, if any.

15 Claims, 3 Drawing Sheets

SYSTEM AND METHOD FOR DETERMINING COMPRESSION RATES FOR IMAGES COMPRISING TEXT

TECHNICAL FIELD

The invention relates to a system and method for determining compression rates for images.

BACKGROUND

Storage space and bandwidth are two valuable resources in the computing and computer networks industries. Vast and ever-increasing amounts of data are transferred over computer networks such as the Internet, and various systems are required to store vast amounts of that data for future use. In order to improve utilization of such resources, many solutions have been devised to compress the data, in order for it to require less storage space and in order to reduce the required bandwidth for transferring it between machines connected to the computerized networks.

Many data compression solutions exist, aimed at improving the utilization of the storage space and bandwidth resources. Some solutions are focused at compressing visual information (e.g. images and/or videos), whereas other solutions are focused at compressing textual information. In some cases, visual information can comprise also textual information, such as in the case of an image (e.g. a screenshot) that comprises text (a character, or a sequence of characters). Over compressing such visual information may lead to the textual information being unreadable. On the other hand, under compressing such information (out of a concern that over compression will render the textual information unreadable) leads to a waste of storage space and/or bandwidth resources.

There is thus a need in the art for a new method and system for a system and method for determining compression rates for images comprising text.

References considered to be relevant as background to the presently disclosed subject matter are listed below. Acknowledgement of the references herein is not to be inferred as meaning that these are in any way relevant to the patentability of the presently disclosed subject matter.

US Patent Application No. 2018/0157906 (Loginov et al.), published on Jun. 7, 2018, discloses a method of analyzing a digital image of a document (to determine, as example, a document suitability for server-based OCR processing) in a computer system that includes a user electronic device (for acquiring or storing a digital image of a document) connectable to a server (for executing the server-based OCR processing of the digital image to create a recognized-text document). The method is executable by the user electronic device and comprises: acquiring the digital image of the document; analyzing an OCR quality parameter associated with a compressed digital image to be created from the digital image using a compression algorithm and a compression parameter; in response to the OCR quality parameter being above or equal to a pre-determined threshold: transmitting the compressed digital image to the server. Optionally, the method further comprises compressing the digital image using the compression algorithm and the compression parameter to create the compressed digital image before transmission thereof.

US Patent Application No. 2014/0280517 (White et al.), published on Sep. 18, 2014, discloses systems and methods for capturing interaction data relating to a host application (app) implemented on a mobile device are disclosed. A tracking module is embedded in the host application. Interaction data relating to the host application is captured on the mobile device with the tracking module. The captured interaction data is transmitted from the mobile device.

U.S. Pat. No. 8,997,081 (Manion et al.), published on Mar. 31, 2015, discloses a tag delivery network for delivering tags to collect analytics related to use of mobile applications. The tag delivery network may include multiple servers for communicating with mobile devices executing mobile applications. The mobile applications may be any mobile application that has been recompiled with, for example, a particular line of code and a static library. A recompiled mobile application may initiate a browser when executed by a mobile device. The tag delivery network may deliver a tag container to the browser. The tag container may load a bootstrap file which in turn may load one or more rule files and code files. These files may cause the mobile device to modify an appearance of the mobile application. The modification may be performed to carry out multivariate testing (e.g., A/B testing), content swapping, optimization of the mobile application, or personalization of the mobile application.

GENERAL DESCRIPTION

In accordance with a first aspect of the presently disclosed subject matter, there is provided a system for determining compression rates for images, the system comprising a processing resource configured to: provide for each screen of one or more screens of an application: (a) text displayed on the respective screen, (b) a compression ratio associated with the respective screen, if any, and (c) a compression ratio determination status associated with the respective screen; receive, from a given device executing the application, a compressed screenshot of a given screen of the screens of the application, compressed in accordance with the compression ratio associated with the given screen, or, upon no compression ratio being associated with the given screen, in accordance with a default compression ratio; and upon the provided compression ratio determination status of the given screen being indicative of a non-final compression ratio, perform the following: perform Optical Character Recognition (OCR), using OCR software, on the compressed screenshot, giving rise to OCR text; determine an accuracy score by comparing the OCR text to the text provided for the given screen; upon the accuracy score being below a threshold, set the compression ratio determination status of the given screen to be indicative of a final compression ratio; and upon the accuracy score being equal to or above a threshold, increase the compression ratio.

In some cases, the processing resource is further configured to perform the following, before receiving the compressed screenshot: receive, from the given device, a request to obtain the compression ratio of the given screen; send, to the given device, the compression ratio associated with the given screen, or, upon no compression ratio being associated with the given screen, one of: (a) the default compression ratio or (b) an indication that no compression ratio is associated with the given screen.

In some cases, the application is a mobile application and wherein the given device is a mobile device.

In some cases, the default compression rate is determined by the processing resource, or by a second processing resource of the given device, based on one or more parameters that affects a layout of the given screen.

In some cases, the parameters include one, or more, of the following group: (a) a density of a display of the given device on which the given screen is displayed, (b) a resolution of the display of the given device, (c) an average text size on the display of the given device, (d) an operating system of the given device, or (e) a make and model of the given device.

In some cases, the compressed screenshot is compressed using JPEG compression.

In some cases, the compression ratio is based on: a scale of the JPEG compression and a quality of the JPEG compression.

In some cases, the processing resource is further configured to store the compressed screenshot in a data repository.

In some cases, the processing resource is further configured to: retrieve the compressed screenshot from the data repository; and display the compressed screenshot to a user of the system.

In some cases, the accuracy score is highest upon the OCR text and the text provided for the given screen entirely matching.

In some cases, the threshold is the accuracy score that is highest.

In accordance with a second aspect of the presently disclosed subject matter, there is provided a system for determining compression rates for images, the system comprising a processing resource configured to: obtain a given image at least partially comprising a given text; compress the given image at a given compression ratio, giving rise to a compressed image; perform Optical Character Recognition (OCR) on the compressed image, giving rise to OCR text; compare the OCR text to the given text, giving rise to comparison results; upon the comparison results meeting a rule, increase the given compression rate; and upon the compression results not meeting a rule, return to a previous compression rate, if any.

In accordance with a third aspect of the presently disclosed subject matter, there is provided a method for determining compression rates for images, the method comprising: providing, by a processing resource, for each screen of one or more screens of an application: (a) text displayed on the respective screen, (b) a compression ratio associated with the respective screen, if any, and (c) a compression ratio determination status associated with the respective screen; receiving, by the processing resource, from a given device executing the application, a compressed screenshot of a given screen of the screens of the application, compressed in accordance with the compression ratio associated with the given screen, or, upon no compression ratio being associated with the given screen, in accordance with a default compression ratio; and upon the provided compression ratio determination status of the given screen being indicative of a non-final compression ratio, performing the following by the processing resource: perform Optical Character Recognition (OCR), using OCR software, on the compressed screenshot, giving rise to OCR text; determine an accuracy score by comparing the OCR text to the text provided for the given screen; upon the accuracy score being below a threshold, set the compression ratio determination status of the given screen to be indicative of a final compression ratio; and upon the accuracy score being equal to or above a threshold, increase the compression ratio.

In some cases, the method further comprises performing the following by the processing resource, before receiving the compressed screenshot: receive, from the given device, a request to obtain the compression ratio of the given screen; send, to the given device, the compression ratio associated with the given screen, or, upon no compression ratio being associated with the given screen, one of: (a) the default compression ratio or (b) an indication that no compression ratio is associated with the given screen.

In some cases, the application is a mobile application and wherein the given device is a mobile device.

In some cases, the default compression rate is determined by the processing resource, or by a second processing resource of the given device, based on one or more parameters that affects a layout of the given screen.

In some cases, the parameters include one, or more, of the following group: (a) a density of a display of the given device on which the given screen is displayed, (b) a resolution of the display of the given device, (c) an average text size on the display of the given device, (d) an operating system of the given device, or (e) a make and model of the given device.

In some cases, the compressed screenshot is compressed using JPEG compression.

In some cases, the compression ratio is based on: a scale of the JPEG compression and a quality of the JPEG compression.

In some cases, the method further comprises storing the compressed screenshot in a data repository.

In some cases, the method further comprises: retrieving the compressed screenshot from the data repository; and displaying the compressed screenshot to a user.

In some cases, the accuracy score is highest upon the OCR text and the text provided for the given screen entirely matching.

In some cases, the threshold is the accuracy score that is highest.

In accordance with a fourth aspect of the presently disclosed subject matter, there is provided a method for determining compression rates for images, the method comprising: obtaining, by a processing resource, a given image at least partially comprising a given text; compressing, by the processing resource, the given image at a given compression ratio, giving rise to a compressed image; performing, by the processing resource, Optical Character Recognition (OCR) on the compressed image, giving rise to OCR text; comparing, by the processing resource, the OCR text to the given text, giving rise to comparison results; upon the comparison results meeting a rule, increasing, by the processing resource, the given compression rate; and upon the compression results not meeting a rule, returning, by the processing resource, to a previous compression rate, if any.

In accordance with a fifth aspect of the presently disclosed subject matter, there is provided a non-transitory computer readable storage medium having computer readable program code embodied therewith, the computer readable program code, executable by at least one processing resource of a computer to perform a method comprising: obtaining, by the processing resource, a given image at least partially comprising a given text; compressing, by the processing resource, the given image at a given compression ratio, giving rise to a compressed image; performing, by the processing resource, Optical Character Recognition (OCR) on the compressed image, giving rise to OCR text; comparing, by the processing resource, the OCR text to the given text, giving rise to comparison results; upon the comparison results meeting a rule, increasing, by the processing resource, the given compression rate; and upon the compression results not meeting a rule, returning, by the processing resource, to a previous compression rate, if any.

In accordance with a sixth aspect of the presently disclosed subject matter, there is provided a non-transitory computer readable storage medium having computer readable program code embodied therewith, the computer readable program code, executable by at least one processing resource of a computer to perform a method comprising: providing, by a processing resource, for each screen of one or more screens of an application: (a) text displayed on the respective screen, (b) a compression ratio associated with the respective screen, if any, and (c) a compression ratio determination status associated with the respective screen; receiving, by the processing resource, from a given device executing the application, a compressed screenshot of a given screen of the screens of the application, compressed in accordance with the compression ratio associated with the given screen, or, upon no compression ratio being associated with the given screen, in accordance with a default compression ratio; and upon the provided compression ratio determination status of the given screen being indicative of a non-final compression ratio, performing the following by the processing resource: perform Optical Character Recognition (OCR), using OCR software, on the compressed screenshot, giving rise to OCR text; determine an accuracy score by comparing the OCR text to the text provided for the given screen; upon the accuracy score being below a threshold, set the compression ratio determination status of the given screen to be indicative of a final compression ratio; and upon the accuracy score being equal to or above a threshold, increase the compression ratio.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "receiving", "performing", "determining", "setting", "increasing", "sending", "storing", "retrieving", "displaying", "compressing" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example." "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
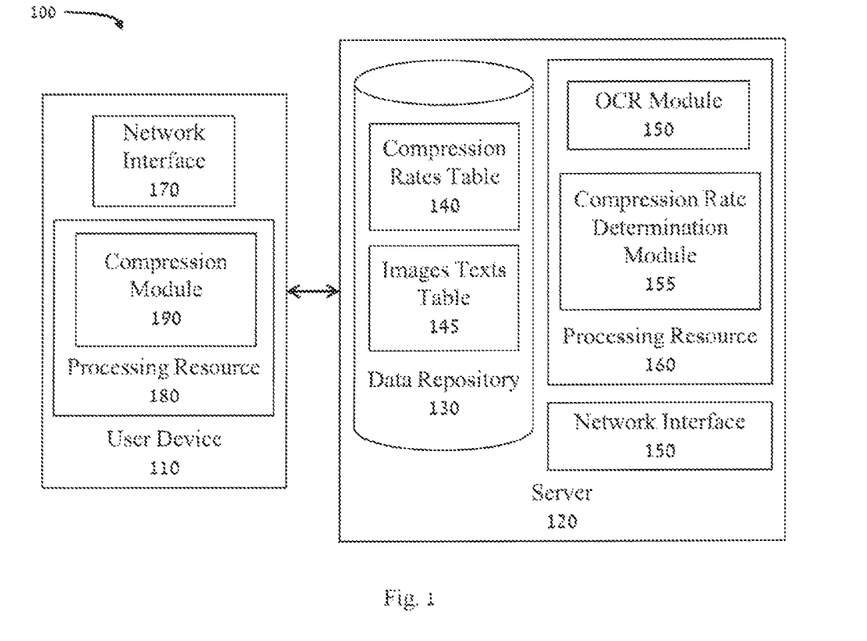
FIG. 1 is a block diagram schematically illustrating one example of a system for determining compression rates for images comprising texts, in accordance with the presently disclosed subject matter.

In embodiments of the presently disclosed subject matter, fewer, more and/or different stages than those shown in FIGS. 2-5 may be executed. In embodiments of the presently disclosed subject matter one or more stages illustrated in FIGS. 2-5 may be executed in a different order and/or one or more groups of stages may be executed simultaneously. FIG. 1 illustrates a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a block diagram schematically illustrating one example of a system for determining compression rates for images comprising texts, in accordance with the presently disclosed subject matter.

In accordance with the presently disclosed subject matter, the system 100 can include a server 120. Server 120 comprises a processing resource 160. Processing resource 160 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant server 120 resources and for enabling operations related to server 120 resources.

The processing resource 160 comprises an Optical Character Recognition (OCR) module 150 and a compression rate determination module 155.

OCR module 150 is configured to perform OCR (e.g. using known methods and/or techniques) on an image comprising text, in order to identify the text comprised within an image analyzed thereby. It is to be noted that when reference is made throughout the detailed description to a text that appears within an image, the text is a character, or a sequence of characters, also referred to as "a string" in computer science, or a plurality of strings located anywhere within the image.

Figure 2:
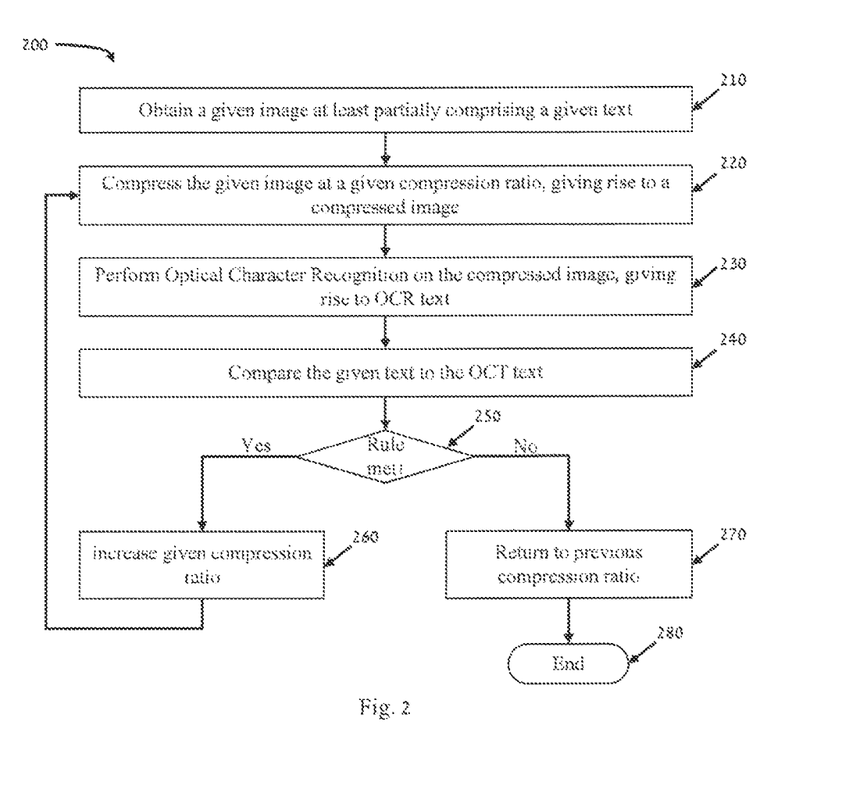
FIG. 2 is a flowchart illustrating one example of a sequence of operations carried out for determining compression rates for images comprising texts, in accordance with the presently disclosed subject matter.
Figure 3:
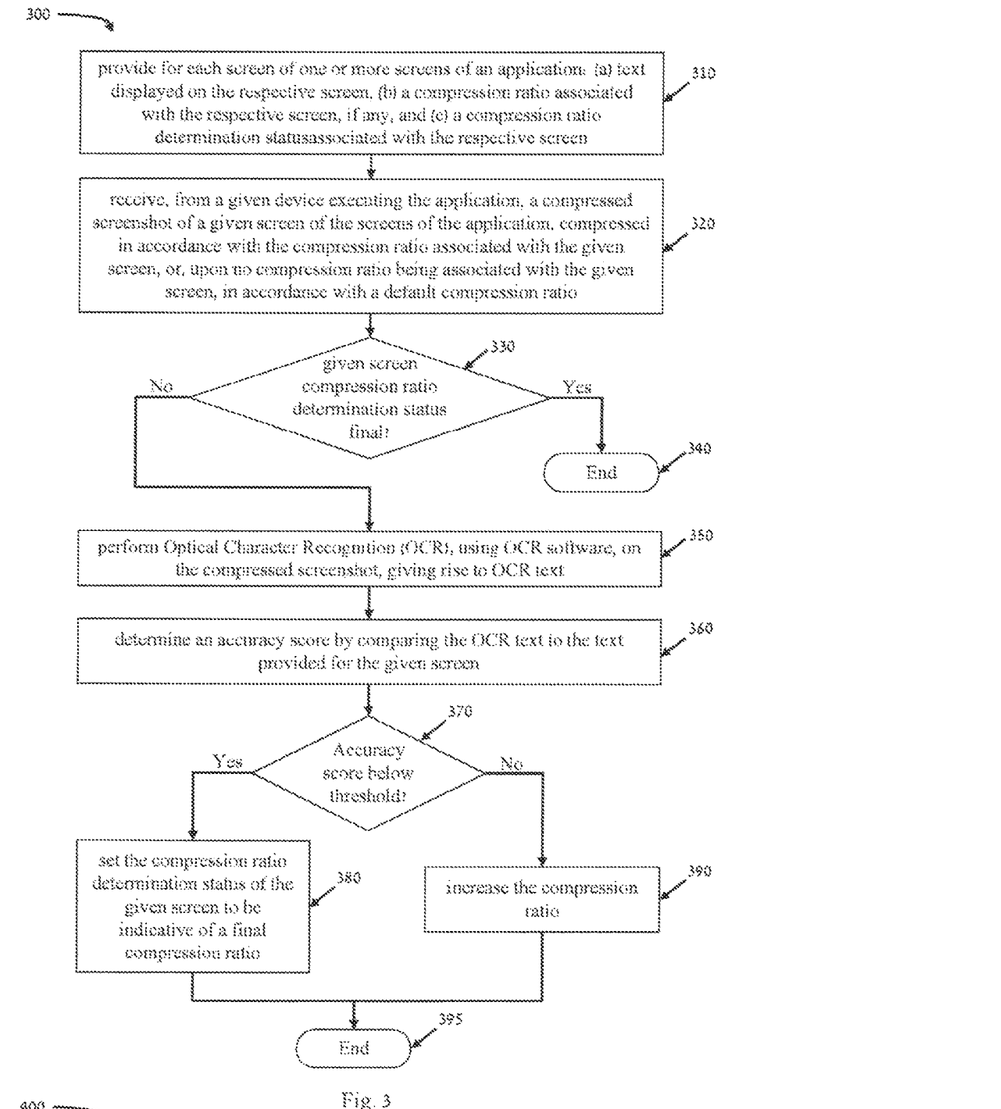
FIG. 3 is a flowchart illustrating a more specific example of a sequence of operations carried out by a server for determining compression rates for screenshots of screens of an application in a client-server architecture, in accordance with the presently disclosed subject matter.
Figure 4:
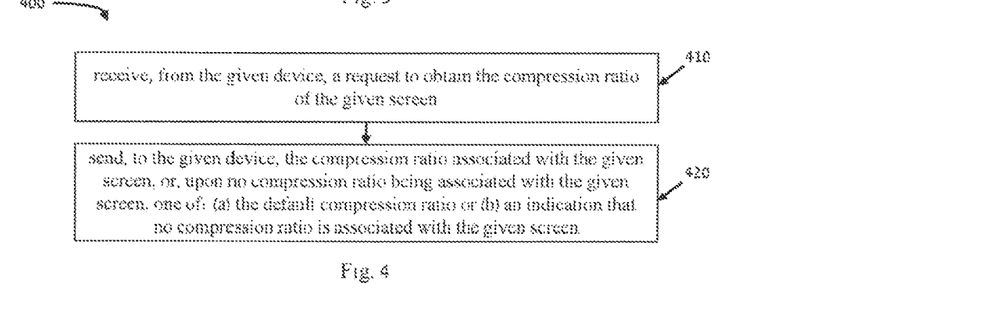
FIG. 4 is a flowchart illustrating one example of a sequence of operations carried out by a server for providing a client with a compression ratio of a given screen of an application in a client-server architecture, in accordance with the presently disclosed subject matter.

Compression rate determination module 155 is configured to determine a compression ratio for a given image, utilizing the OCR module 150, as further detailed herein, inter alia with reference to FIGS. 2-4.

Server 120 further comprises a data repository 130 (e.g. a database, a storage system, a memory including Read Only Memory—ROM, Random Access Memory—RAM, or any other type of memory, etc.) configured to store data, including, inter alia, images texts table 145 and a compression rates table 140.

The images texts table 145 can include, for each image of one or more images, the texts displayed thereon. For example, assuming that a given image displays the text "hello world", the images texts table 145 can include an identifier of the given image that enables unique identification thereof, and the string "hello world" associated therewith. In other words, images texts table 145 includes one or more identifiers of respective images, and strings that represent text comprised within each respective image.

The compression rates table 140 can include, for each image of one or more images, a compression ratio (if previously determined for such image, or if a default compression ratio exists for such image), and optionally a compression ratio determination status, indicative of whether the compression ratio associated with each image is a final compression ratio, or not. The compression ratios within the compression rates table 140 can be updated, e.g. in accordance with the process disclosed with respect to FIGS. 2 and/or 3.

Server 120 further comprises a network interface 165 enabling connecting the server 120 to one or more user devices 110, via a communication network such as the Internet, and enabling it to send and receive data sent thereto through the communication network, including sending compression rates to the user devices 110 and/or receiving images (whether in a compressed format or not) from the user devices 110 for determining a compression rate for the images and/or for recordation thereof, as detailed herein, inter alia with reference to FIGS. 2-5.

System 100 can further comprise one or more user devices 110. User devices 110 can be any type of computerized device, including desktop computers, laptop computers, tablets, smartphones, smart televisions, or any other device with data processing capabilities.

Figure 5:
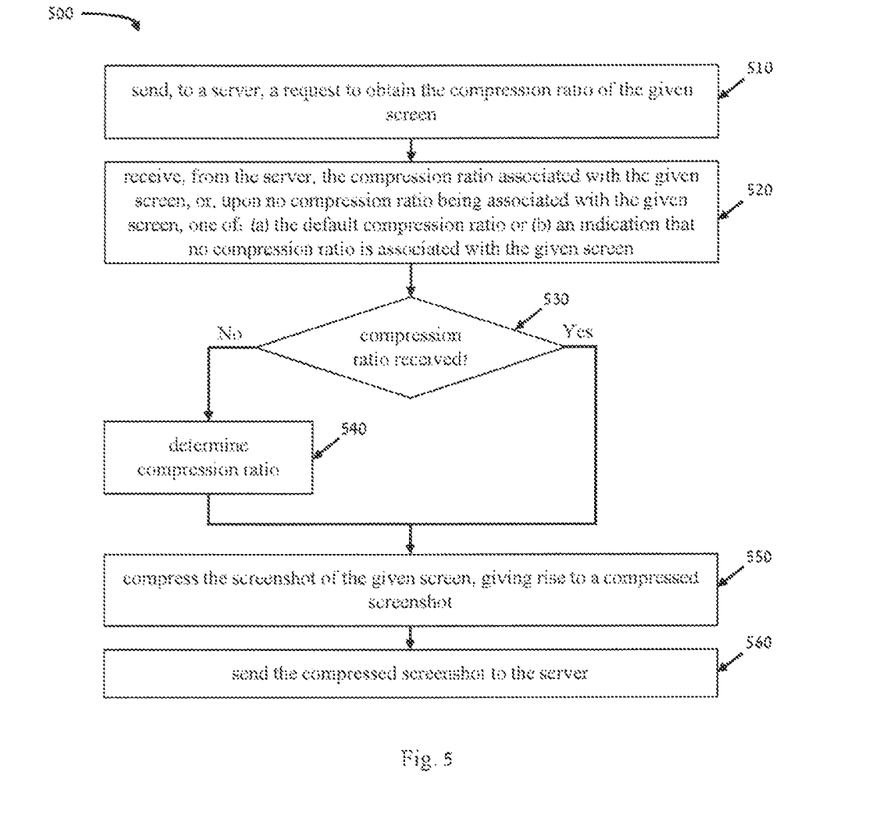
FIG. 5 is a flowchart illustrating one example of a sequence of operations carried to out by a client for providing a server with a compressed screenshot in a client-server architecture, in accordance with the presently disclosed subject matter.

User device 110 comprises a network interface 170 enabling connecting the user device 110 to the server 120, via a communication network such as the Internet, and enabling it to send and receive data sent thereto through the communication network, including sending images (compressed or not) to the server 120 and/or receiving compression rates from the server 120 according to which images are compressed thereby, as detailed herein, inter alia with reference to FIG. 5.

User device 110 further comprises a processing resource 180. Processing resource 180 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant user device 110 resources and for enabling operations related to user device 110 resources.

The processing resource 180 comprises a compression module 190. Compression module 190 is configured to send images to the server 120, whether in a compressed format, or raw images, as further detailed herein, inter alia with reference to FIG. 5.

In some cases, the system 100 can be configured to record sessions conducted by users of the user devices 110. In such cases, the recorded sessions can be stored on the data repository 130, and they can be retrieved therefrom for viewing. The recorded sessions can be comprised of a plurality of images, each being a screenshot captured by a device on which the respective session is conducted.

Although FIG. 1 refers to a client-server architecture, the presently disclosed subject matter is not limited to such client-server architecture, and it can be performed by a standalone device (e.g. user device 110 or server 120) capturing images and compressing them while determining a compression ratio utilizing OCR, as detailed herein with respect to FIG. 2.

Attention is drawn to FIG. 2, a flowchart illustrating one example of a sequence of operations carried out for determining compression rates for images comprising texts, in accordance with the presently disclosed subject matter.

According to certain examples of the presently disclosed subject matter, server 120 can be configured to perform a compression rate determination process 200, e.g. utilizing compression rate determination module 155.

For this purpose, server 120 is configured to obtain a given image, at least partially comprising a given text (block 210). The image can be a digital representation of a photograph, a computer-generated image, or any other digital representation of a two-dimensional image (whether capturing a real-world scene/object, or a computer-generated scene/object). The obtained given image can be a raw image, that has not been compressed, or an image that has already been compressed to some extent.

The server 120 compresses the given image at a given compression ratio, giving rise to a compressed image (block 220). The given compression ratio can be retrieved from the compression rates table 140. The compressed image is of smaller size relative to the given image obtained at block 210 (i.e. it captures less storage space on a computerized memory on which it is stored).

The server 120 performs OCR (e.g. utilizing the OCR module 150) on the compressed image generated at block 220, giving rise to OCR text (block 230). The server 120 then compares the OCR text with the given text comprised within the given image (block 240). It is to be noted that for the purpose of the presently disclosed subject matter, it is assumed that the given text comprised within the given image obtained at block 210 is a known text that is accessible by the server 120.

A check is then made, whether a rule is met (block 250). In some cases, the rule can require a complete success of the OCR, so that the OCR text is identical to the given text within the given image. In other cases, a threshold degree of similarity level is determined, and in such cases, the rule can be met when the degree of similarity between the OCR text and the given text within the given image exceeds the threshold.

For example, assuming that the given text within the given image is "Good morning Sir", and that the OCR text being the result of the OCR process performed on the given image is also "Good morning Sir", the OCR text and the given text are identical, and the compression did not result in any mismatch between the given text and the OCR text. Assuming that the OCR text being the result of the OCR process performed on the given image is "God normng Sr", the degree of similarity between the OCR text and the given text is clearly not perfect similarity, due to the fact that they differ from one another. In this example, there is a difference in a certain number of characters between the OCR text and the given text, a difference that can be enumerated, and based on which a degree of similarity can be determined. It is to be noted that although reference in this example is to a single sentence, in some cases the text can be comprised of a plurality of sentences. In such cases, various parts of the text can be analyzed independently (e.g. in an iterative process where each part is analyzed in a corresponding iteration), or they can all be regarded as "the text" and analyzed together.

One example of a method for determining a degree of similarity between the OCR text and the given text is by comparing a number of characters of the OCR text that are identical to respective characters of the given text. It is to be noted however, that other methods can be used to determine a degree of similarity between the OCR text and the given text.

It is to be noted that in some cases the OCR can fail (e.g. due to poor image quality which renders the characters therein unreadable) and return an error code. In such cases, the rule is not met.

Upon the rule being met, the server 120 can increase the given compression ratio (block 260), and repeat blocks 220-260, until the rule is not met. When the rule is not met, the server can return to the previous compression rate (block 270), being the compression rate used in a previous iteration of the compression rate determination process 200, and the process ends (block 280).

Although not shown in the figure, it is to be noted that if there is no previous iteration (i.e. the rule was not met already in a first run of the compression rate determination process 200), the server can decrease the compression ratio, if possible, and repeat blocks 220-260 until the rule is not met.

As a result of the process, a desired compression rate that meets the rule of block 250 is identified.

It is to be noted that although reference is made in the context of the compression rate determination process 200 to the server 200, the compression rate determination process 200 can be performed by any other computerized device having data processing capabilities, mutatis mutandis.

It is to be noted that, with reference to FIG. 2, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

FIG. 3 is a flowchart illustrating a more specific example of a sequence of operations carried out by a server for determining compression rates for screenshots of screens of an application in a client-server architecture, in accordance with the presently disclosed subject matter.

As indicated herein, in some cases there is a need in determining compression rates for screenshots, e.g. when recording sessions conducted by a plurality of user devices 110. The sessions can be, for example, sessions of the user devices 110 interacting with a given service provider via a dedicated application. As a more specific example, the sessions can be sessions conducted by users of the user devices via a mobile application of a certain bank. In such cases, there is a need in the user devices 110 capturing screenshots of screens of the application, and sending such screenshots for recordation by the server 120. It is desirable that the screenshots (that are digital images of the screen presently viewed by the user of the mobile device 110) will be compressed in a manner that will not affect the ability of a user that wishes to replay the session to understand the texts displayed on the screenshot.

Therefore, according to certain examples of the presently disclosed subject matter, server 120 can be configured to perform a screenshot compression rate determination process 300, e.g. utilizing compression rate determination module 155.

For this purpose, server 120 is configured to provide, for each screen of one or more screens of an application: (a) text displayed on the respective screen (e.g. stored within the images texts table 145), and (b) a compression ratio associated with the respective screen (e.g. stored within compression rates table 140), if any, and (c) a compression ratio determination status associated with the respective screen (e.g. also stored within compression rates table 140) (block 310). It is to be noted that the term provide in this context means make available in any manner, whether locally (e.g. on a local data repository such as data repository 130), or remotely (e.g. via a network connection to an external device on which such data is stored in a manner that enables retrieval of the data, or parts thereof), as long as those parts of the data referred to at block 310 that are required for performing the screenshot compression rate determination process 300 as detailed herein are available.

Accordingly, for each of the screens of the application, (a) the text displayed thereon is provided, (b) a compression ratio is provided if previously determined (whether it was determined in accordance with a default value, or manually, or in accordance with the screenshot compression rate determination process 300 detailed herein, or in any other method), and (c) a compression rate determination status indicative of whether the compression ratio associated with the respective screen is final, or not.

Server 120 received, receive, from a given device (e.g. user device 110) executing the application, a compressed screenshot of a given screen of the screens of the application, compressed in accordance with the compression ratio associated with the given screen, or, upon no compression ratio being associated with the given screen, in accordance with a default compression ratio (block 320).

Attention is drawn, in the context of block 320, to FIG. 4, a flowchart illustrating one example of a sequence of operations carried out by a server for providing a client with a compression ratio of a given screen of an application in a client-server architecture, in accordance with the presently disclosed subject matter.

According to certain examples of the presently disclosed subject matter, server 120 can be configured to perform a compression ratio provisioning process 400, to provide a user device with a compression ratio according to which a screenshot of the given screen (the screen whose compressed screenshot is to be later received by the server 120 at block 320) is to be compressed. The compression ratio provisioning process 400 can be performed e.g. utilizing compression rate determination module 155.

For this purpose, server 120 is configured to receive, from the given device (e.g. the user device 110 from which the compressed screenshot is received), a request to obtain the compression ratio of the given screen (block 410). The determination of the compression ratio associated with the given screen can be made using the data provided at block 310, e.g. by retrieving the compression ratio of the given screen using a respective screen identifier.

Server 120 is further configured to send, to the given device, the compression ratio associated with the given screen (e.g. following retrieval thereof form the compression rates table 140), or, upon no compression ratio being associated with the given screen, one of: (a) the default compression ratio or (b) an indication that no compression ratio is associated with the given screen (block 420).

The operation of the user device 110 which communicates with the server 120 in respect to the compression ratio provisioning process 400 is described herein, with reference to FIG. 5.

It is to be noted that, with reference to FIG. 4, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Returning to FIG. 3, server 120 is further configured to check if the compression ratio determination status of the given screen, provided at block 310, is indicative of a final compression ratio being determined for the given screen (block 330). If the compression ratio determination status is indeed indicative that the compression ratio associated with the given screen is its final compression ratio, the screenshot compression rate determination process 300 ends.

However, if the compression ratio determination status is not indicative that the compression ratio associated with the given screen is its final compression ratio, the server 120 is configured to perform Optical Character Recognition (OCR), using OCR software, on the compressed screenshot, giving rise to OCR text (block 350). The server 120 determines an accuracy score, based on a comparison of the OCR text (determined at block 350) and the text associated with the given screen (as provided at block 310) (block 360). It is to be noted that although reference in this example is to the text as a whole, in some cases the text can be comprised of a plurality of portions. In such cases, various parts of the text can be analyzed independently (e.g. in an iterative process where each part is analyzed in a corresponding iteration), or they can all be regarded as "the text" and analyzed together.

In some cases, the accuracy score can be a binary score— e.g. one for full match between the OCR text and the text associated with the given screen, and zero if any mismatch exists between the OCR text and the text associated with the given screen (or if the OCR failed and returned an error code). In other cases, the accuracy score can be determined in accordance with a degree of similarity between the OCR text and the text associated with the given screen (which can be determined, for example, in accordance with the teachings made with reference to block 250 of FIG. 2).

The server 120 then checks if the accuracy score is below a threshold (block 370). If it is not below the threshold, server increases the compression ratio associated with the given screen to be used in subsequent iterations of the screenshot compression rate determination process 300, e.g. by updating its value in the compression rates table 140 (block 390). However, if the compression ratio is below the threshold, the server sets the compression ratio determination status of the given screen to be indicative of a final compression ratio, e.g. by updating the compression ratio determination status of the given screen within the compression rates table 140 (block 380).

It is to be noted that in addition to performing the screenshot compression rate determination process 300, the received compressed screenshot (received at block 320) is stored in the data repository 130 for future retrieval, e.g. when a user of the system 100 requests to replay a session conducted by a user of a respective user device 110.

It is to be noted that, with reference to FIG. 3, some of the blocks can be integrated into a consolidated block or can be broken down to a few blocks and/or other blocks may be added. Furthermore, in some cases, the blocks can be performed in a different order than described herein (for example, block 320 can be performed before block 310). It should be also noted that whilst the flow diagram is described also with reference to the system elements that realizes them, this is by no means binding, and the blocks can be performed by elements other than those described herein.

Finally, attention is drawn to FIG. 5, a flowchart illustrating one example of a sequence of operations carried out by a client for providing a server with a compressed screenshot in a client-server architecture, in accordance with the presently disclosed subject matter.

According to certain examples of the presently disclosed subject matter, server 120 can be configured to perform a compression ratio obtainment process 500, to obtain, from the server 120, a compression ratio according to which a screenshot of the given screen (the screen whose compressed screenshot is to be later received by the server 120 at block 320) is to be compressed. The compression ratio obtainment process 500 can be performed e.g. utilizing compression module 190. It is to be noted that the compression ratio obtainment process 500 performed by the user device 110 corresponds to the compression ratio provisioning process 400 performed by the server 120, as detailed herein.

For this purpose, user device 110 is configured to send, to the server 120, a request to obtain the compression ratio of a given screen so that the user device 110 can compress a screenshot of the given screen accordingly (block 510). The request is received by the server at block 410.

User device 110 receives from the server, in response to the request, the compression ratio associated with the given screen, or, upon no compression ratio being associated with the given screen, one of: (a) the default compression ratio (if there is a default compression ratio) or (b) an indication that no compression ratio is associated with the given screen. The server sends the requested information at block 420.

User device 110 checks if a compression ratio was received (block 530). If it wasn't received (e.g. in case no compression ratio is associated with the given screen), the user device 110 determines a compression ratio (block 540). If a compression ratio was received, or following determination of the compression ratio of block 540, user device 110 compresses a screenshot of the given screen captured thereby, giving rise to a compressed screenshot (block 550) and sends the compressed screenshot to the server (block 560), which receives it on block 320.

It is to be noted that, with reference to FIG. 5, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

It is to be noted that FIGS. 3-5 refer to a scenario of session recording that is performed between a user device 110 and a server 120. In this scenario the images that are compressed are screenshots of screens displayed on the user devices during sessions conducted via an application installed on the user devices 110. However, the teachings herein are not limited to such a client/server architecture, and the process can also be performed on a standalone device, as detailed, for example, with reference to FIG. 2.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for determining compression rates for images, the system comprising a processing resource configured to:
provide for each screen of one or more screens of an application: (a) text displayed on the respective screen, (b) a compression ratio associated with the respective screen, if any, and (c) a compression ratio determination status associated with the respective screen;
receive, from a given device, a request to obtain the compression ratio of a given screen of the screens of the application;
send, to the given device, the compression ratio associated with the given screen, or, upon no compression ratio being associated with the given screen, one of: (a) a default compression ratio or (b) an indication that no compression ratio is associated with the given screen;
receive, from the given device executing the application, a compressed screenshot of the given screen, compressed in accordance with the compression ratio associated with the given screen, or, upon no compression ratio being associated with the given screen, in accordance with the default compression ratio; and
upon the provided compression ratio determination status of the given screen being indicative of a non-final compression ratio, perform the following:
perform Optical Character Recognition (OCR), using OCR software, on the compressed screenshot, giving rise to OCR text;
determine an accuracy score by comparing the OCR text to the text provided for the given screen;
upon the accuracy score being below a threshold, set the compression ratio determination status of the given screen to be indicative of a final compression ratio; and
upon the accuracy score being equal to or above a threshold, increase the compression ratio.

2. The system of claim 1, wherein the application is a mobile application and wherein the given device is a mobile device.

3. The system of claim 1, wherein the default compression rate is determined by the processing resource, or by a second processing resource of the given device, based on one or more parameters that affects a layout of the given screen.

4. The system of claim 3, wherein the parameters include one, or more, of the following group: (a) a density of a display of the given device on which the given screen is displayed, (b) a resolution of the display of the given device, (c) an average text size on the display of the given device, (d) an operating system of the given device, or (e) a make and model of the given device.

5. The system of claim 1, wherein the compressed screenshot is compressed using JPEG compression, and wherein the compression ratio is based on: a scale of the JPEG compression and a quality of the JPEG compression.

6. The system of claim 1, wherein the processing resource is further configured to:
store the compressed screenshot in a data repository;

retrieve the compressed screenshot from the data repository; and display the compressed screenshot to a user of the system.

7. The system of claim 1, wherein the accuracy score is highest upon the OCR text and the text provided for the given screen entirely matching.

8. A method for determining compression rates for images, the method comprising:

providing, by a processing resource, for each screen of one or more screens of an application: (a) text displayed on the respective screen, (b) a compression ratio associated with the respective screen, if any, and (c) a compression ratio determination status associated with the respective screen;

receiving, by the processing resource, from a given device, a request to obtain the compression ratio of a given screen of the screens of the application;

sending, by the processing resource, to the given device, the compression ratio associated with the given screen, or, upon no compression ratio being associated with the given screen, one of: (a) a default compression ratio or (b) an indication that no compression ratio is associated with the given screen;

receiving, by the processing resource, from the given device executing the application, a compressed screenshot of the given screen, compressed in accordance with the compression ratio associated with the given screen, or, upon no compression ratio being associated with the given screen, in accordance with the default compression ratio; and upon the provided compression ratio determination status of the given screen being indicative of a non-final compression ratio, performing the following by the processing resource:

perform Optical Character Recognition (OCR), using OCR software, on the compressed screenshot, giving rise to OCR text;

determine an accuracy score by comparing the OCR text to the text provided for the given screen;

upon the accuracy score being below a threshold, set the compression ratio determination status of the given screen to be indicative of a final compression ratio; and upon the accuracy score being equal to or above a threshold, increase the compression ratio.

9. The method of claim 8, wherein the application is a mobile application and wherein the given device is a mobile device.

10. The method of claim 8, wherein the default compression rate is determined by the processing resource, or by a second processing resource of the given device, based on one or more parameters that affects a layout of the given screen.

11. The method of claim 10, wherein the parameters include one, or more, of the following group: (a) a density of a display of the given device on which the given screen is displayed, (b) a resolution of the display of the given device, (c) an average text size on the display of the given device, (d) an operating system of the given device, or (e) a make and model of the given device.

12. The method of claim 8, wherein the compressed screenshot is compressed using JPEG compression and wherein the compression ratio is based on: a scale of the JPEG compression and a quality of the JPEG compression.

13. The method of claim 8, further comprising:

storing the compressed screenshot in a data repository;

retrieving the compressed screenshot from the data repository; and displaying the compressed screenshot to a user.

14. The method of claim 8, wherein the accuracy score is highest upon the OCR text and the text provided for the given screen entirely matching.

15. A non-transitory computer readable storage medium having computer readable program code embodied therewith, the computer readable program code, executable by at least one processing resource of a computer to perform a method comprising:

providing, by a processing resource, for each screen of one or more screens of an application: (a) text displayed on the respective screen, (b) a compression ratio associated with the respective screen, if any, and (c) a compression ratio determination status associated with the respective screen;

receiving, by the processing resource, from a given device, a request to obtain the compression ratio of a given screen of the screens of the application;

sending, by the processing resource, to the given device, the compression ratio associated with the given screen, or, upon no compression ratio being associated with the given screen, one of: (a) a default compression ratio or (b) an indication that no compression ratio is associated with the given screen;

receiving, by the processing resource, from the given device executing the application, a compressed screenshot of the given screen, compressed in accordance with the compression ratio associated with the given screen, or, upon no compression ratio being associated with the given screen, in accordance with the default compression ratio; and upon the provided compression ratio determination status of the given screen being indicative of a non-final compression ratio, performing the following by the processing resource:

perform Optical Character Recognition (OCR), using OCR software, on the compressed screenshot, giving rise to OCR text;

determine an accuracy score by comparing the OCR text to the text provided for the given screen;

upon the accuracy score being below a threshold, set the compression ratio determination status of the given screen to be indicative of a final compression ratio; and upon the accuracy score being equal to or above a threshold, increase the compression ratio.

* * * * *